A. B. CADMAN.
VEHICLE COUPLING MEANS.
APPLICATION FILED DEC. 11, 1916.

1,245,676.

Patented Nov. 6, 1917.
4 SHEETS—SHEET 2.

Witnesses:
U. P. Kilroy
Harry R. L. White

Inventor:
Addi Benjamin Cadman
By Miller Chindahl Parker
Attys.

A. B. CADMAN.
VEHICLE COUPLING MEANS.
APPLICATION FILED DEC. 11, 1916.

1,245,676.

Patented Nov. 6, 1917.
4 SHEETS—SHEET 3.

Witnesses:
W. P. Kilroy
Harry R. L. White

Inventor:
Addi Benjamin Cadman
By Miller Chindahl & Parker
Attys.

UNITED STATES PATENT OFFICE.

ADDI BENJAMIN CADMAN, OF BELOIT, WISCONSIN, ASSIGNOR TO WARNER MANUFACTURING COMPANY, OF SOUTH BELOIT, ILLINOIS, A CORPORATION OF ILLINOIS.

VEHICLE-COUPLING MEANS.

1,245,676.     Specification of Letters Patent.     Patented Nov. 6, 1917.

Application filed December 11, 1916. Serial No. 136,178.

*To all whom it may concern:*

Be it known that I, ADDI BENJAMIN CADMAN, a citizen of the United States, residing at Beloit, in the county of Rock and State of Wisconsin, have invented certain new and useful Improvements in Vehicle-Coupling Means, of which the following is a specification.

This invention relates to the art of vehicle trains comprising four-wheeled trailer trucks which are adapted to be hitched together or to motor vehicles or other traction units by means of draw-bars on the trucks, and the invention refers more particularly to improved means for coupling a trailer truck to a drawing vehicle or to another trailer.

One of the objects of the invention is to provide coupling means by which the operation of attaching the draft device on the motor vehicle to the draw-bar on the trailer may be accomplished by one man, who operates the motor vehicle to back it up to the trailer. Heretofore two men have been necessary, one to back up the motor vehicle, and the other to associate the coupler parts.

Another object of the invention is to provide improved coupling means by which a draft device or pole attached to the leading vehicle may be connected to the draw-bar on the trailer in a manner allowing free up-and-down relative movement of the pole and draw-bar, but preventing any relative lateral movement or play between the two, so that any lateral movement of the draft pole will find immediate response in the movement of the steering wheels on the trailer to which the draw-bar is connected.

A further object is to provide coupling means which comprises an independent draft pole, means for connecting the forward end of the pole to the leading vehicle to allow universal movement of the coupled parts in all directions, and means for connecting the rear end of the pole to the following vehicle and allowing relative up-and-down movement but preventing relative lateral movement of the coupled parts, as above explained.

According to the preferred embodiment of my invention each trailer is of duplicate construction at opposite ends so that the trailer may be drawn and steered from either end. In this connection, it is an object of the invention to produce coupling means for both ends of the trailer adapted to provide either of two styles of coupling depending on which direction the trailer is to run. A universal coupling may be provided at the rear end of the trailer for the draft device of the following trailer, and at the forward end of any trailer a coupling may be provided, the parts of which have relative movement up and down, but no relative lateral movement, as before explained. To accomplish this result the coupler head on each draw-bar of the trailer is specially constructed so that either one of the two styles of coupling connections mentioned may be effected at will, depending upon which end of the trailer is the forward and which the rear end.

Another object of the invention is to provide means whereby the rear end of the coupling pole or device on the motor vehicle may, if desired, be connected to the front draw-bar on a trailer in a manner allowing both relative vertical and lateral movement between the two parts so that the draw-bar may be locked in central position in the body frame and the desired flexibility may still be retained.

Still another object is to provide means for connecting the draft device on the motor vehicle to one corner of the trailer truck frame.

Further objects and advantages of the invention will be apparent from the following detailed description.

In the accompanying drawings.

Figure 1:
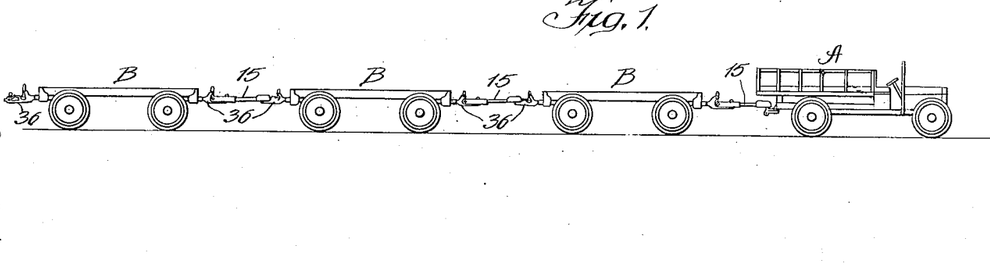
Figure 1 is a side elevation illustrating somewhat diagrammatically a vehicle train comprising a motor truck and three trailer trucks coupled together by means embodying my invention.
Figures 2, 11:
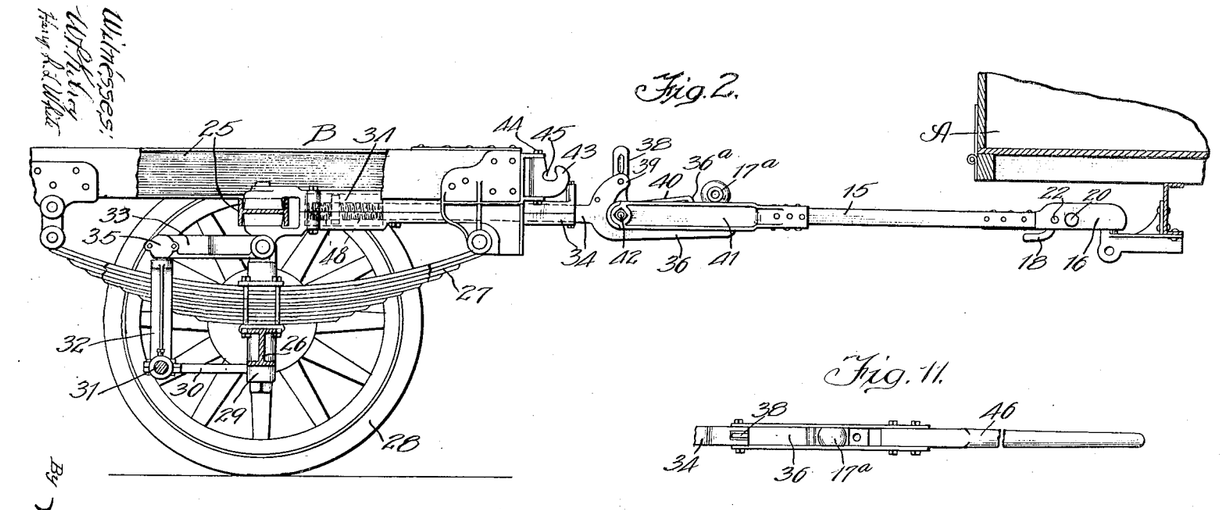
Fig. 2 is an enlarged side elevation, with parts in section, illustrating the forward end of a trailer vehicle, the rear end of a motor vehicle and the means for connecting said vehicles.
Fig. 11 (Sheet 1) is a detail view of a hand steering pole in association with a coupler head.
Figure 8:
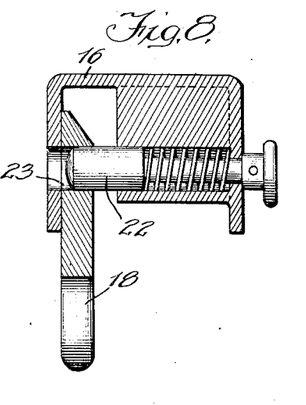
Fig. 8 is a transverse section taken on line 8—8 of Fig. 7.
Figure 9:
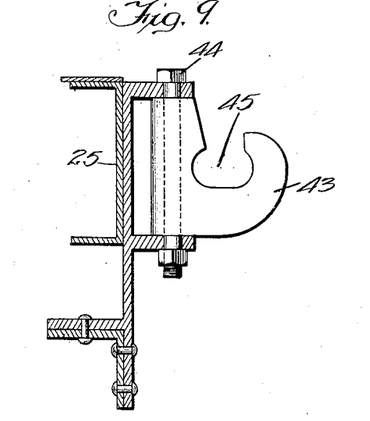
Fig. 9 is a detail view of one of the coupling devices which are mounted on the corners of the body frame of the trailer truck.
Figure 10:
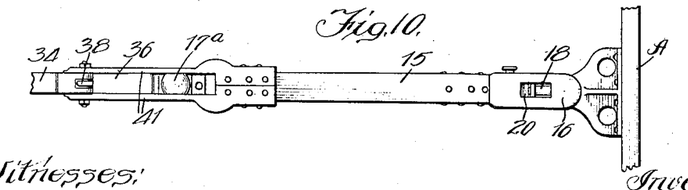
Fig. 10 is a plan view of the coupling pole or draft pole and its associated parts.

Referring to Fig. 1 of the drawings, the letter A designates a traction unit or power vehicle which may be a standard motor truck, and the reference letters B indicate three trailer trucks hitched to the motor vehicle A and to each other in a train. In Fig. 2, the rear end of the motor vehicle and the forward end of a trailer truck are shown, along with the means for coupling them together, the same means being used for coupling any two of the trailer trucks in the train. Said means comprises a draft device or pole 15 which is separate from or independent of the vehicles and which is arranged to be coupled at its opposite ends to the respective pairs of vehicles. The coupling means for the forward end of the draft pole provides a universal connection allowing relative movement of the coupled parts in all directions, said means preferably comprising a disengageable ball and socket joint. I have herein illustrated, by way of example, one form of such a coupling which may be used, said exemplary coupling being disclosed and claimed in my copending application Serial No. 140,080, filed January 2, 1917. This coupling comprises a socket member 16 which is preferably carried by the draft pole, and a ball 17 adapted to engage in the socket, said ball being suitably mounted,—in the case of the motor vehicle being attached to the frame thereof, and in the case of a trailer being carried by the coupler head on the draw-bar, as will be later explained. The socket member carries a retainer which may be in the form of a pivoted lever 18 having an elongated opening 19 between its ends to receive a fixed pin or axis 20 and allow play forward and back on said axis. The lever is constantly urged forward by spring plunger means 21 bearing against the pin 20 so as to exert a constant yielding pressure against the ball. Pivotal movement of the lever about its axis in the direction of the arrow *a* permits the engagement or disengagement of the ball and the socket, and the lever is arranged to be locked in its ball-retaining position by a spring-pressed detent 22 arranged to coöperate with a bevel face on the lever and thus be automatically engaged in a horizontal elongated opening 23 in the lever when the latter moves into ball-retaining position. (See Fig. 8.) The detent 22 while preventing pivotal movement of the lever allows the forward and back movement thereof so as to permit the effective action of the spring means 21. The construction of this universal coupling may be varied or modified, if desired.

The trailer truck shown in the drawings is of the construction disclosed and claimed in my copending application Serial No. 135,419, filed December 6, 1916. The opposite ends of the trailer truck are of duplicate construction so that the truck may be drawn and steered from either end. So far as the coupling means of the present invention is concerned, the truck structure may be varied, but I will briefly describe the exemplary construction shown. This comprises a rectangular body frame 25 supported on an axle 26 through the medium of springs 27, and wheels 28 mounted on the journals of steering knuckles 29 which are pivoted to the ends of the axle on vertical axes. Arms 30 on the steering knuckles are directly connected by a rigid horizontal tie member 31. This tie member is connected through two members 32 and 33 to the draw-bar 34 which is pivoted on a vertical axis to the body frame 25, one of said members 32 being vertically disposed and mounted to rock forward and back on the tie member 31 and the other of said members 33 being horizontally disposed and being pivoted to the draw-bar to rock up and down, the two members having a universal connection preferably by means of a ball and socket 35.

Figure 12:
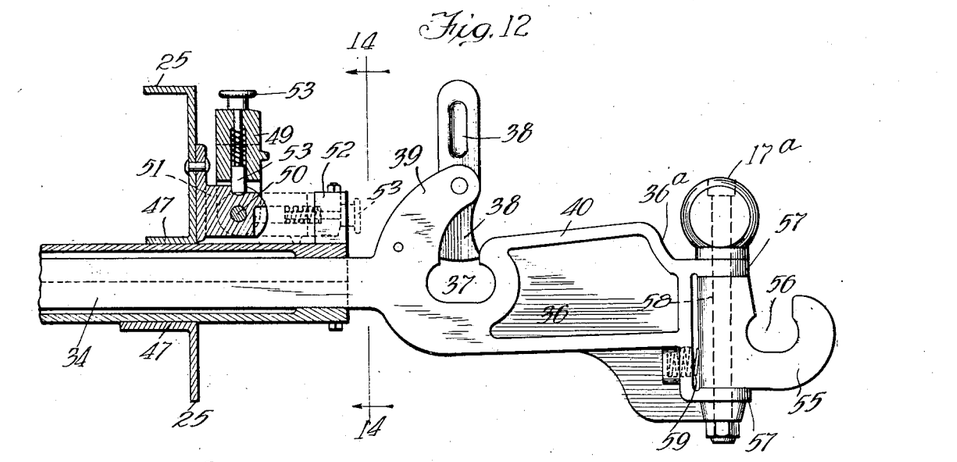
Fig. 12 is a view, partially in section on line 12—12 of Fig. 13, and partially in elevation, illustrating the means for locking the draw-bar in central position on the frame and illustrating a coupler head of alternative construction.
Figure 13:
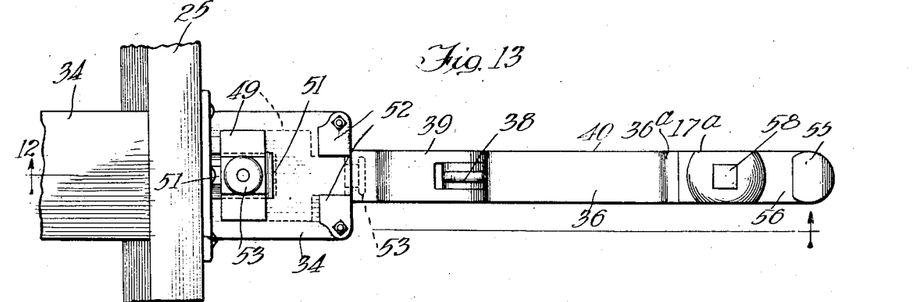
Fig. 13 is a plan view of the parts seen in Fig. 12.
Figure 14:
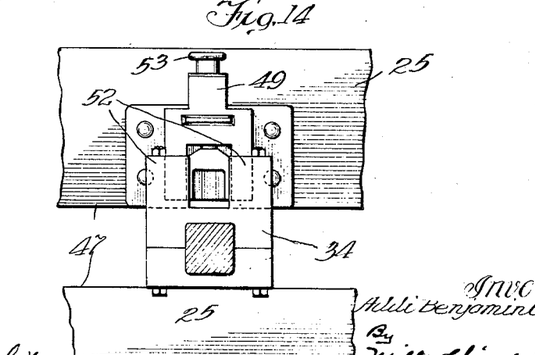
Fig. 14 is a transverse sectional view in the plane of line 14—14 of Fig. 12, showing the draw-bar locking means in front elevation.

The draw-bar passes through a horizontally elongated guideway 47 (Fig. 12) formed between two rails at the end of the body frame, the draw-bar being held by such guideway against up-and-down movement with respect to the frame while being permitted to move horizontally in the guideway. Preferably the draw-bar comprises outer and inner telescoping sections which are cushioned in their relative movement by springs 48 (Fig. 2) as disclosed more fully in my copending application before referred to. The outer section extends through the guideway 47. Means is provided for disengageably locking the draw-bar to the body frame in central position when desired, said means comprising, in the present instance, a retainer 49 (Figs. 12 to 14) pivoted on a horizontal axis 50 to a lug 51 projecting from the end of the body frame, said retainer being arranged to swing down and engage between two upstanding lugs 52 on the outer section of the draw-bar for locking the latter. A slidable spring-pressed detent 53 carried by the retainer is arranged to engage in either of two notches in the supporting lug 51 so as to hold said retainer in its upright inoperative position or in its horizontal operative position, as desired.

The means for coupling the rear end of the draw pole 15 to the draw-bar 34 on the forward end of a trailer comprises a coupler head 36 on the draw-bar preferably of elongated form and having parallel side faces. In the inner end of the coupler head is formed a socket or recess 37 leading down from the top face of the head, the entrance or mouth of the socket being normally closed by a spring-pressed dog 38 in the form of a lever pivoted on a horizontal axis to a lug 39 rising from the head. The upper end of the lever is thus in convenient position to be grasped by the operator for moving the lever into releasing position. The top face 40 of the head constitutes a guide or runway leading to the socket 37.

The draft pole 15 is provided at its rear end with two side members 41 spaced apart the proper distance to receive the coupler head and fit snugly along the opposite sides of the latter. The free ends of the side members are rigidly connected by a cross-pin 42 which is adapted to be received in the socket in the head.

Figure 3:
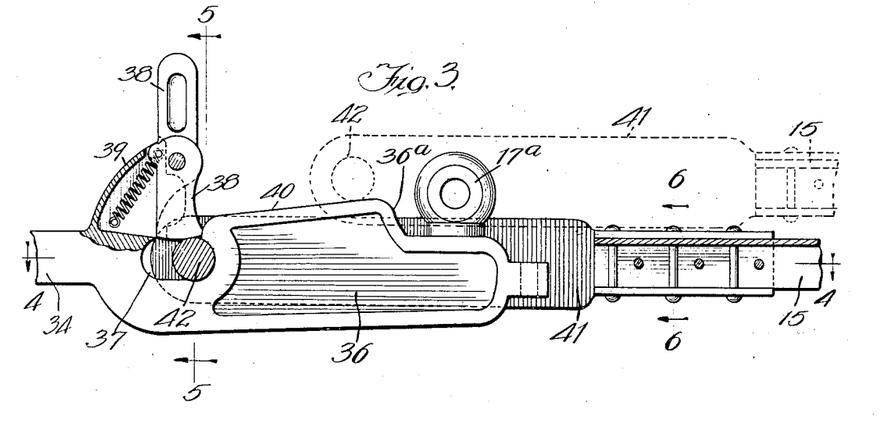
Fig. 3 is an enlarged sectional elevation of the coupling means which connects the trailer draw-bar to the draft pole on the pulling vehicle, the view being taken in the plane of line 3—3 of Fig. 4.
Figure 4:
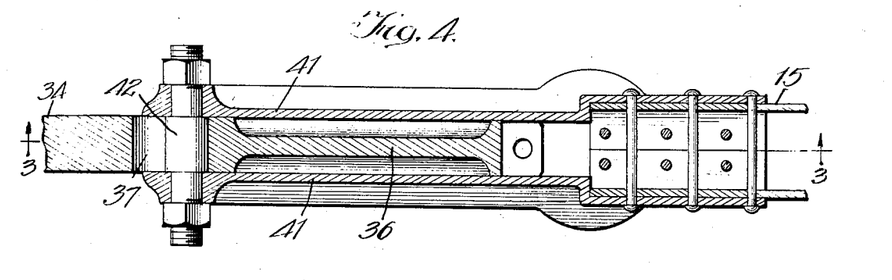
Fig. 4 is a horizontal sectional view on line 4—4 of Fig. 3.
Figure 5:
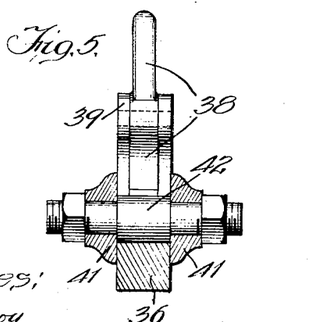
Figs. 5 and 6 are transverse sections taken in the planes of lines 5—5 and 6—6 respectively, of Fig. 3.
Figure 6:
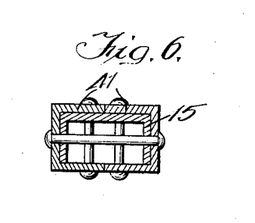
Figure 7:
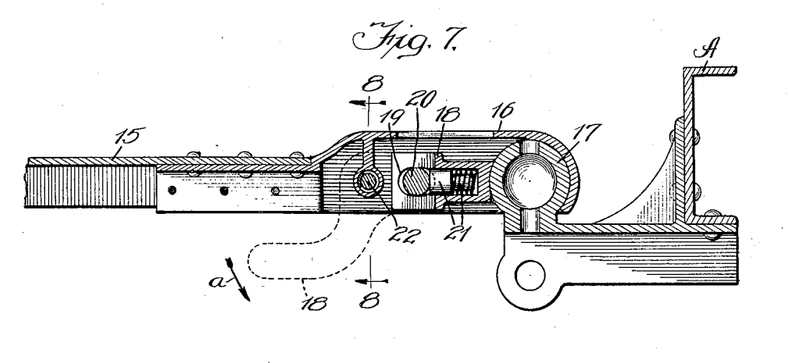
Fig. 7 is an enlarged longitudinal sectional view through the coupling means for connecting the forward end of a draft pole to a pulling vehicle.

When the motor vehicle A is to be attached to a trailer, the operator backs up the motor vehicle to a position where the draft pole 15 may be laid upon the coupler head with the cross-pin 42 resting on the top face or guide 40 on the head and the side members embracing the head, as shown in dotted lines in Fig. 3. The final act of coupling the parts may then be accomplished by the driver backing up the motor vehicle farther to slide the cross pin 42 rearwardly and cause it to push back the dog 38 and drop into the socket 37. The dog will then snap by spring pressure into position above the pin and lock the latter in place. It will thus be seen that the final act of associating the coupler parts in their operative position, which requires accurate and definite positioning of the motor vehicle and trailer, is accomplished by the driver while on the motor vehicle by backing up the latter. Heretofore it has been usual to employ a pin which was dropped through the coupler parts when the pin receiving openings came into registry. This necessitates the presence of a second man to manipulate the pin at the proper time when the driver is backing up the motor vehicle. By my coupler, the work may be quickly and easily done by one man.

A ball 17$^a$ rises from the free end of each coupler head 36 and provides means to coöperate with the socket member 16 on the draft pole 15 for connecting the draw-bar at the rear end of a trailer truck to a following trailer, the connection being a universal one allowing movement of the coupled parts in all directions. The coupler head has a shoulder 36$^a$ adjacent to the ball 17$^a$ to coöperate with the socket 16 of a draft pole. The ball 17$^a$ is vertically alined with the body of the head so that the side members 41 on the draft pole may pass the ball. By this construction the trailer and draft pole may be properly associated no matter which direction the trailer is running so as to provide a universal connection with a draft pole at the rear end of the trailer and provide a joint at the forward end of the trailer which prevents relative lateral movement but allows relative up-and-down movement of the coupled parts. Any one of the trucks B as shown in Fig. 1 may be reversed end for end and coupled to the draft poles 15 at front and rear by these two styles of couplings. While traveling, the rear draw-bar is locked in central position in the frame by the means hereinbefore described, while the forward draw-bar is left free to swing horizontally for steering purposes.

It is sometimes desirable in backing up the motor vehicle and attached trailer to lock the front draw-bar 34 (i. e., the one adjacent to the motor vehicle) in central position on the body frame. In such case it is desirable to provide lateral flexibility, that is to say, relative lateral movement between the draft pole 15 and the coupler head or draw-bar. Such flexibility may be attained by the construction illustrated in Figs. 12 and 13, wherein a coupling element 55, which in the present instance is in the form of a hook, is pivoted on a vertical axis to the extreme end of the coupler head, said coupling element having an upwardly opening socket 56 of shape and size similar to the socket 37 in the body of the coupler head to receive the cross-pin 42 of the draft pole, the side members 41 of the draft pole being adapted to embrace the coupling element 55 in the same way as they do the body of the coupler head when attached to the latter. This special coupling element permits relative lateral as well as vertical movement between the draft pole 15 and the draw-bar 34 so that the latter may be locked in central position on the body frame and still retain flexibility between the motor vehicle and trailer. In the present instance the coupling element 55 is located directly beneath the universal ball 17$^a$, being fitted into a recess between two projecting lugs 57 on the coupler head, and secured by a vertical bolt 58. Spring means 59 is provided for normally holding the coupling element 55 in alinement with the body of the coupler head while allowing said coupling element to swing laterally on its pivot. This spring means is in the present instance in the form of a coiled compression spring which is seated in a socket in the coupler head and bears at one end against a flat face on the coupling element 55.

The corners of the body frame 25 carry coupling elements 43 similar to the element 55, said corner elements 43 being pivoted on vertical axes by means of bolts 44 passing through lugs on the body frame. The elements 43 have sockets 45 which are preferably similar in size and shape to the sockets 37 and 56 so that the coupling elements 43 are adapted to coöperate with the same draft device as that used with the coupling elements on the trailer draw-bar.

It frequently happens in the use of four-wheel trailer trucks of this character that it is desirable to place a truck alongside of a loading platform in a restricted space. By attaching the draft device 15 to one of the corner coupling elements 43, the truck may be pushed by the motor vehicle from one corner of the truck, the power being directly applied to the corner of the body frame instead of through the draw-bar. This leaves the draw-bar free to be manually operated or, in fact, both draw-bars at the opposite ends of the trailer truck may be manipulated by hand to place all four wheels in such position that when power is applied to the corner of the body frame the truck may be moved into the desired position. This feature is of great value in the practical handling of these trucks. To facilitate the manual steering of the draw-bars, I provide a tongue or handle 46 (Fig. 11) which may be constructed at one end similar to the rear end of the draft device 15, i. e., equipped with side members adapted to fit snugly along the opposite sides of a coupler head 36 and a cross pin carried at the end of said side members and adapted to be received in the socket 37 in the coupler head. By the use of such a tongue greater leverage may be had on the draw-bar so that the wheels may be easily steered by hand.

While I have herein shown and described in considerable detail the preferred embodiment of my invention, I recognize that many modifications will occur to those skilled in the art and do not limit myself to the precise structure disclosed. The scope of the invention is pointed out in the appended claims.

I claim as my invention:

1. Coupling means of the character described comprising, in combination, a draft bar having an elongated head thereon with parallel sides and with a guide face at the top of the head, the head having a socket extending downwardly from the rear end of said face, a spring-pressed dog normally closing the entrance to said socket, a draft pole having two side members spaced apart a distance to receive said head and fit snugly along the opposite sides thereof and having a cross-pin rigidly connecting the free ends of said side members and adapted to be received in said socket in the head, the draft pole being adapted to be associated with the head in a preliminary way by resting the cross-pin on the top guide face of the head and then pushing the draft pole endwise to slide the pin along said face and cause it to move the retaining dog away and drop into said socket.

2. Coupling means of the character described comprising a coupler head having a top guide face and a socket leading downwardly therefrom, and a coöperating coupling element having a part adapted to rest upon and slide along said guide face and drop into said socket.

3. Coupling means of the character described comprising a coupler head having a top guide face and a socket leading downwardly therefrom, a spring-pressed dog normally closing said socket, and a coöperating coupling element having a part adapted to rest upon said guide face and be moved therealong into engagement with the dog and past the dog into said socket.

4. Coupling means of the character described having, in combination, a coupler head having two sides and having a top guide face and a socket leading downwardly therefrom, a coöperating coupling element having two side members adapted to closely embrace the sides of the head and having a cross-pin connecting said side members and adapted to rest upon and slide along said face and drop into said socket, and means for preventing escape of the pin from said socket.

5. Coupling means of the character described comprising a coupler head of narrow elongated form having parallel vertical sides, a socket, an upstanding ball, a coupling element pivoted on the free end of said head adjacent to said ball, said ball and coupling element being in vertical alinement with the coupler head, and a coöperating coupling element comprising spaced side members adapted to pass downwardly over said ball and said element and snugly embrace said head, and a cross-pin connecting said side members adapted to engage in said socket.

6. Coupling means of the character described, having, in combination, a head having a socket leading down from its upper side, and a coöperating coupling element comprising parts to closely embrace the head and a part to occupy said socket, whereby to allow free vertical pivotal movement between the coupling elements while preventing any relative lateral movement therebetween.

7. A truck having a draw-bar which has permanently mounted thereon two coupling elements having similarly shaped coupling means, one of said elements being rigid with the bar and the other element being pivotally connected to the bar.

8. Coupling means of the character described comprising, in combination, a coupling element having a socket opening upwardly and being mounted to move about a vertical axis located close to said socket, and a coöperating coupling element having two side members to embrace the first element and further having a cross-piece connecting said side members and adapted to engage in the socket in the first element.

9. Coupling means of the character described having, in combination, a coupling element having a socket and having a long substantially horizontal guideway leading thereto, and a coöperating coupling element adapted to be guided along said guideway and having a part to be thereby moved into said socket.

10. A coupler head of narrow elongated form having parallel vertical sides, a socket, an upstanding ball, and a coupling element pivoted on the free end of said head adjacent to said ball.

11. Coupling means of the character described having, in combination, a coupling element having a socket, a spring-pressed dog normally closing the entrance thereto, and a coöperating coupling element having a part to push the dog aside and enter said socket, the dog then snapping into position to hold said part in the socket, the first mentioned coupling element being arranged to slidably support and guide the other element prior to the entry of the said part into the socket.

12. Coupling means of the character described having, in combination, a coupling element having a socket and having a spring-pressed retainer normally closing the entrance thereto, and a coöperating coupling element having parts to overlap the first element and having a part to engage in said recess, the two coupling elements then having free relative vertical movement, but being held by their overlapping relation from relative lateral movement.

13. The combination of a draft pole having means on its forward end to be detachably connected to a drawing vehicle, a trailer truck provided with a pivoted drawbar having a coupler head on its forward end, said head having a socket extending down from its upper face and having a spring-pressed retainer closing the mouth of the socket, and means on the rear end of said draft pole to coöperate with said coupler head comprising side members to snugly embrace the head, and a cross-pin connecting said side members and adapted to engage in said socket in the head.

14. A trailer truck having two pivoted draw-bars projecting from opposite ends thereof and equipped with two pairs of wheels and steering connections between the respective draw-bars and pairs of wheels, each draw-bar having on its outer end a coupler head provided with a socket extending down from the top face thereof and further provided with an upstanding ball, the head being adapted to coöperate with a draft device which snugly embraces the head and has a cross-pin to engage in the socket for pulling the truck and said ball being adapted to coact with a socket on the draft device of a following trailer, whereby the trailer is adapted to be connected at either end to a drawing vehicle and whereby a series of trucks may be connected in a train.

15. A coupler head for trailer trucks comprising a body having a top guiding face and a downwardly extending recess at one end of said face and having an upstanding ball at the opposite end of said face.

16. A trailer truck having a draw-bar provided on one end with a coupler head, said head comprising an elongated body having a top guide face and having a downwardly extending recess at the end of said guide face adjacent to the body of the draw-bar, the head further having an upstanding ball at the opposite end of the guide face or the free end of the head.

17. A vehicle train comprising a motor vehicle for drawing the train, and a plurality of trailer trucks, each truck being of duplicate construction at opposite ends and each end comprising a pivoted draw-bar and supporting wheels connected to be steered thereby, each draw-bar having on its free end a coupler head of elongated shape provided with a recess on its top face and an upstanding ball, and draft poles each connecting two of the vehicles together, each draft pole having at its forward end a detachable socket device to receive a ball on the vehicle ahead and having at its rear end a pair of members to embrace the coupler head on the following vehicle and provided with a cross-pin to engage in the recess in said head.

18. A vehicle train comprising a plurality of reversible four-wheeled trucks, each truck having at each end thereof a pivoted draw-bar and supporting wheels connected to be steered thereby, the drawbars having permanently mounted on their free ends coupler heads of duplicate construction, each head comprising means for attaching the draw-bar to the vehicle head to allow relative movement up and down but prevent relative lateral movement of the coupled parts, each coupler head further comprising means to permit its connection to a vehicle behind to allow a universal movement of the parts in all directions.

19. The combination of a trailer truck having a draw-bar pivoted thereto, a separate draft pole arranged to be detachably connected at its forward end to a drawing vehicle, and means for detachably connecting the rear end of said draft pole to the trailer draw-bar comprising overlapping parts on said pole and bar arranged to prevent relative lateral movement therebetween, one of said parts having a socket leading downwardly and the other part having a cross-pin to engage in said socket whereby to allow pivotal movement up-and-down between said pole and bar.

20. The combination of a trailer truck having a draw-bar pivoted thereto, a separate draft pole arranged to be detachably connected at its forward end to a drawing vehicle, and means to detachably connect the rear end of said draft pole to the forward end of said draw-bar comprising an elongated coupler head on the draw-bar having a socket extending down from its top face, and two spaced side members on the rear end of said pole adapted to snugly embrace the coupler head and having a connecting cross-pin adapted to engage in said socket in the head whereby to allow free relative up-and-down movement of the pole and draw-bar while preventing relative lateral movement between said parts.

21. A truck having, in combination, a body frame and steering wheels, a pivoted draw-bar connected to said wheels for steering them, said draw-bar having a socket therein opening at the top of the bar to receive a draft device, and members pivoted on vertical axes on the corners of the body frame and each having a socket therein opening at the top of the member and being similar to the socket in the draw-bar to receive the same coupling device.

22. A truck having, in combination, a body frame and steering wheels, a pivoted draw-bar connected to said wheels for steering them, said draw-bar having a socket therein opening at the top of the bar to receive a draft device, and members mounted at the corners of the body frame and each having a socket therein opening at the top of the member and being similar to the socket in the draw-bar to receive the same coupling device.

23. A truck having, in combination, a body frame and steering wheels, a pivoted draw-bar connected to said wheels for steering them, and members mounted on the corners of said body frame, said members and draw-bar having similarly shaped sockets to receive a coupling device.

24. The combination of a truck having a body frame and a pivoted draw-bar, coupling members pivoted on vertical axes on the corners of the body frame and each having a socket, and a rigid draft pole having a coupling element comprising sides adapted to embrace said members and a cross-pin to engage in said sockets to afford a horizontal pivotal connection, the truck being arranged to be drawn forwardly or pushed rearwardly through the medium of the said coupled parts.

25. The combination of a truck having a body frame and a pivoted draw-bar, coupling members pivoted on vertical axes on the corners of the body frame, and a rigid draft pole having a coupling element arranged to interengage with either of said coupling members whereby the truck may be either drawn forwardly or pushed rearwardly through the medium of the said coupled parts.

26. A draft pole having permanently mounted on one end a socket member adapted to receive a ball and on its other end a pair of spaced parallel side members and a cross-pin connecting said members.

27. A coupler head of elongated form having parallel vertical sides, an upwardly opening socket, and an upstanding ball.

28. A truck having, in combination, a body frame and steering wheels, a pivoted draw-bar connected to said wheels for steering them, and a coupling element permanently mounted on the free end of said draw-bar to swing on a vertical axis.

29. A truck having, in combination, a body frame and steering wheels, a pivoted draw-bar connected to said wheels for steering them, said draw-bar having a coupler head on its free end provided with a socket, and a coupling element pivoted on the free end of said coupler head and provided with a similar socket, the two sockets being adapted to coöperate with the same draft device.

30. A truck having, in combination, a body frame and steering wheels, a pivoted draw-bar connected to said wheels for steering them, said draw-bar having a coupler head on its free end provided with a downwardly opening socket, a coupling element pivoted on a vertical axis on the free end of said coupler head and provided with a downwardly opening socket, and coupling elements pivoted on vertical axes on the corners of the body frame and provided with downwardly opening sockets, all of said sockets being adapted to coöperate with the same coupling element.

31. The combination of a truck having a body frame and steering wheels, a pivoted draw-bar connected to said wheels for steering them, means for locking said draw-bar in central position with relation to the body frame, a coupler head carried at the free end of said draw-bar and provided with a socket leading downwardly from the upper face of the head, a coöperating coupling device comprising side members adapted to embrace the coupler head and a cross-pin carried by the side members and arranged to engage in said socket, and a coupling element pivoted on a vertical axis on said coupler head, the latter coupling element being adapted to be embraced by the side members of the said coöperating coupling device and being provided with a downwardly opening socket to receive the said cross-pin.

32. The combination of a truck having a body frame and steering wheels, a pivoted draw-bar connected to said wheels for steering them, means for locking said draw-bar in central position with relation to the body frame, a draft device, coupler means for coupling said draft device to the draw-bar and arranged to allow relative up-and-down movement therebetween but prevent lateral movement, and means permanently mounted on the draw-bar and adapted to coöperate with the coupling parts on said draft device to afford a connection between the draw-bar and the draft device which allows both relative up-and-down movement and relative lateral movement between the two.

33. The combination of a trailer truck having a draw-bar, a separate draft pole arranged to be detachably connected at its forward end to a drawing vehicle, and means for detachably connecting the rear end of said draft pole to the forward end of said draw-bar comprising a coupling element mounted on said draw-bar and a coupling element mounted on said draft pole, one of said elements having a socket and the other element having a part to engage in said socket, and said coupling elements being arranged to overlap and lie closely side-by-side horizontally, whereby said elements will permit relative up-and-down movement but prevent relative lateral movement between said draw-bar and draft pole.

34. The combination of a truck having a draw-bar, a separate draft device, and means for coupling said draft device and draw-bar together in either of two ways, to allow relative up-and-down movement while preventing relative lateral movement or to allow both relative up-and-down and lateral movement, the last mentioned means comprising two coupling elements permanently mounted on said draw-bar, and a coöperating element permanently mounted on said draft device and arranged to be associated with either of the first mentioned coupling elements.

35. A truck having, in combination, a body frame, a pivoted draw-bar, a socketed coupler head carried by the free end of said draw-bar, and a socketed coupling element movably mounted upon the free end of said coupler head, said head and said element being arranged to coact independently of each other with the same complementary coupling device.

36. The combination of a truck having a draw-bar, a coupler head carried thereby, a coupling element movably mounted on said head, and a coöperating coupling device arranged to be associated either with the coupler head or with said coupling element.

37. The combination of a truck having a draw-bar, a coupler head carried thereby and having an upwardly opening socket, a coupling element pivoted on a vertical axis on the free end of said head and having an upwardly opening socket, and a coöperating coupling device arranged to coöperate either with the coupler head or with said coupling element.

38. The combination of a truck having a draw-bar, a coupler head carried thereby and having an upwardly opening socket, a coupling element pivoted on a vertical axis on the free end of said head and having an upwardly opening socket, a coöperating coupling device arranged to coöperate either with the coupler head or with said coupling element, said device comprising two side members adapted to snugly embrace the coupler head, and a part to engage in the socket therein to allow relative up-and-down movement while preventing relative lateral movement between the coupled parts.

39. Coupling means of the character described comprising, in combination, a coupler head having parallel vertical sides and having a socket extending downwardly from the top of the head, a coöperating coupling device comprising side members adapted to closely embrace the sides of said head, and a cross-pin connecting said side members and adapted to engage in said socket, and a coupling element movably mounted upon the coupler head and adapted to coöperate with the said coupling device.

40. Coupling means of the character described comprising, in combination, a coupler head having a socket extending downwardly from the top of the head, a coöperating coupling device having means to overlap said coupler head and to engage in said socket whereby to allow relative up-and-down movement while preventing relative lateral movement between the coupled parts, and a coupling element pivoted on the coupler head on a vertical axis and having a downwardly opening socket arranged to receive the part on said coupling device whereby to provide both relative up-and-down and relative lateral movement between the coupled parts.

41. The combination of a vehicle having a draw-bar, a separate draft device, and coupling means allowing the draft device to be attached to the draw-bar in either of two positions with relation to the draw-bar.

42. The combination of a vehicle having a draw-bar, a separate draft device, means for connecting said device to the draw-bar to allow relative up-and-down movement while preventing relative lateral movement therebetween, and means including another coupling element permanently mounted on said draw-bar for connecting said draft device and draw-bar in a manner allowing both relative up-and-down and relative lateral movement therebetween.

43. A trailer truck having two pivoted draw-bars projecting from opposite ends thereof and equipped with two pairs of wheels and steering connections between the respective draw-bars and pairs of wheels, each draw-bar having on its outer end a coupler head provided with a socket and with an upstanding ball, the head being adapted to coöperate with a coupling element on the draft device which engages said head and the socket therein for pulling and steering the truck, and said ball being adapted to coact with a socket on the draft device of a following trailer.

44. A trailer truck having two pivoted draw-bars projecting from opposite ends thereof and equipped with two pairs of wheels and steering connections between the respective draw-bars and pairs of wheels, each draw-bar having permanently mounted thereon two coupling elements, one for use in pulling and steering the trailer and the other for use in attaching another trailer behind.

45. A trailer truck having two pivoted draw-bars projecting from opposite ends thereof and equipped with two pairs of wheels and steering connections between the respective draw-bars and pairs of wheels, each draw-bar having permanently mounted thereon two coupling elements, one for use in pulling the trailer and the other for use in attaching another trailer behind, in combination with a draft pole having on its rear and front ends respectively coupling elements to coact with the said coupling elements on the draw-bars.

46. A trailer truck having two pivoted draw-bars projecting from opposite ends thereof and equipped with two pairs of wheels and steering connections between the respective draw-bars and pairs of wheels, each draw-bar having thereon three coupling elements, one for pulling and steering the truck, another for backing the truck and a third for coupling another trailer on behind.

47. A trailer truck having two pivoted draw-bars projecting from opposite ends thereof and equipped with two pairs of wheels and steering connections between the respective draw-bars and pairs of wheels, each draw-bar having thereon three coupling elements, one for pulling and steering the truck, another for backing the truck and a third for coupling another trailer on behind, in combination with a draft pole having at one end a coupling element adapted to coöperate with the first and second mentioned elements on the draw-bar and having at its other end a coupling element adapted to coact with the third mentioned coupling element on the draw-bar.

In testimony whereof, I have hereunto set my hand.

ADDI BENJAMIN CADMAN.